United States Patent [19]

Stevens et al.

[11] Patent Number: 4,462,979

[45] Date of Patent: Jul. 31, 1984

[54] PROCESS FOR PREPARING SOFT TIO$_2$ AGGLOMERATES

[75] Inventors: William E. Stevens, Newark, Del.; Joel B. Hill, Jr., Eva, Tenn.; Reg Davies, Newark, Del.

[73] Assignee: E. I. Du Pont de Nemours and Company, Wilmington, Del.

[21] Appl. No.: 352,075

[22] Filed: Feb. 25, 1982

[51] Int. Cl.$^3$ ............................................. C01G 23/07
[52] U.S. Cl. .................................. 423/613; 423/612; 165/96; 165/1
[58] Field of Search ............................. 423/612–614; 165/1

[56] References Cited

U.S. PATENT DOCUMENTS

| 2,508,271 | 5/1950 | Kichma | 423/613 |
| 2,508,272 | 5/1950 | Booge | 423/613 |
| 2,721,626 | 12/1955 | Rick | 423/613 |
| 2,909,409 | 10/1959 | Gregory | 423/613 |
| 3,217,787 | 11/1965 | Preston | 165/1 |
| 3,506,065 | 4/1970 | Hilgers et al. | 165/2 |
| 3,586,489 | 6/1971 | Hilgers et al. | 423/613 |
| 3,607,049 | 9/1971 | Weaver et al. | 423/614 |
| 3,966,892 | 6/1976 | Okudaira et al. | 423/613 |

FOREIGN PATENT DOCUMENTS

| 1284955 | 12/1968 | Fed. Rep. of Germany | 423/613 |
| 2455034 | 5/1976 | Fed. Rep. of Germany | 423/613 |

*Primary Examiner*—Herbert T. Carter

[57] ABSTRACT

A flue for cooling the flow of reaction product from the high temperature oxidation of a metal halide to the metal oxide in the presence of oxygen, said flue comprising a first section wherein the cross-sectional area is increased thereby decreasing the turbulence of the flow and a second section wherein the cross-sectional area is decreased thereby increasing the velocity or turbulence of the flow and the process for using said flue to produce an agglomerate of TiO$_2$ particles that are readily filterable and easily ground.

3 Claims, No Drawings

PROCESS FOR PREPARING SOFT TIO₂ AGGLOMERATES

DESCRIPTION

1. Technical Field

This invention relates to a cooling flue configuration oxidation system wherein a metal halide is oxidized to the metal oxide with oxygen at high temperatures and a process for the preparation of a metal oxide in said system, whereby the metal oxide produced are agglomerates which are readily filtered and can be easily deagglomerated in conventional grinding.

2. Background Art

In the production of titanium dioxide pigment described in U.S. Pat. No. 2,833,627, vaporized and preheated titanium tetrachloride is fed to a high temperature reaction zone where it is mixed with oxygen or oxygen-containing gases. The oxygen and the titanium tetrachloride react to form chlorine and titanium dioxide, and the latter is carried from the principal reaction zone in a mixture of chlorine and residual gases. This exiting suspension is usually at temperatures considerably in excess of 1000° C.; and due to this high temperature and corrosive nature of the gases present, it is necessary to cool this suspension before the separation step. The cooling can be achieved by passing the hot, gas-containing reaction products through a heat exchanger which is a long conduit or pipe having cooled walls.

It is known that the cooling of such gaseous suspensions and the precipitation and separation of the fine solid particles from the suspension gases involve great technical difficulties. In many cases the cooling must be effected very rapidly in order to avoid an undesirable growth of fine solid particles, which would decrease their usefulness as pigmentary materials or add to the expense of achieving the desired properties.

U.S. Pat. No. 2,909,409 discloses cooling the oxidation products from titanium tetrachloride and oxygen by the use of cooled gases from the oxidation chamber that has had suspended TiO₂ removed to avoid very difficult problems, among which are coarsening of the TiO₂ pigments.

U.S. Pat. No. 3,217,787 discloses the cooling of hot gaseous suspensions of TiO₂ pigment particles and that TiO₂ particles behave as if they were plastic and sticky at 1800°-400° C. This stickiness causes the pigment to form soft, loosely adherent coatings on the surface. The need to cool rapidly below the tackiness point for the pigment to avoid formation of soft, loosely adherent coatings is disclosed.

U.S. Pat. No. 3,506,065 discloses the cooling of the mixture of TiO₂ burdened reaction gases by returning cooled reaction gases for contact with the hot reaction gases thereby controlling the quenching rate of the TiO₂ pigment. The temperature reduction by said cooling is sufficient to decrease stickiness of the pigment to avoid TiO₂ depositing on the cooling chamber surfaces.

Disclosure of the Invention

Now it has been found that if the turbulence of the gaseous mixture from the reaction of TiCl₄ and oxygen maintained in a certain range defined by Reynolds number in a particular temperature region while cooling, the tendency of the particles to form hard agglomerates relative to agglomerates formed in a cooling system without reduced turbulence is minimized. When the flow of TiO₂ particles and the gaseous mixture is then caused to flow with greater turbulence relative to that in the preceding section while cooling is in effect, the particles of TiO₂ agglomerate to form soft agglomerates that are easily filterable. These soft agglomerates of TiO₂ survive slurrying and wet treatment (precipitation of materials, e.g., silica, alumina, etc., to enhance pigmentary characteristics) and result in much faster filtration rates than agglomerates otherwise obtained. The soft agglomerates, however, do not survive grinding. The grinding energy necessary to later grind the agglomerates to achieve the desired pigmentary properties, e.g., in a fluid energy mill, is less than when hard agglomerates are produced.

What is meant by hard agglomerates is agglomerates of ultimate particles of TiO₂ that are harder to break up, as evidence by higher steam to pigment ratio in the fluid energy mill to reach a given paint film gloss, than agglomerates produced in a flue of the present invention.

What is meant by soft agglomerates is agglomerates of ultimate particles of TiO₂ that are easier to break up, as evidenced by a lower steam to pigment ratio in the fluid energy mill to reach a given paint film gloss, than agglomerates produced in a flue where there is little change in turbulence other than turbulence changes caused merely by physical property changes as the reaction mixture cools.

The use of a flue configuration that produces little change in the turbulence of the reaction mixture during cooling, other than turbulence changes caused by physical property changes as the reaction mixture cools, referred to herein as constant turbulence, can result in the formation of hard agglomerates. These hard agglomerates, however, possess filtration rates slightly better than the filtration of rates of the present invention. We have found, however, that the use of merely a flue with a section that produces a reduced turbulence without any subsequent increased turbulence produces a TiO₂ agglomerate that is softer than agglomerates prepared in a flue under constant turbulence but equivalent in softness to the TiO₂ agglomerates of this invention. However, the soft agglomerates that are produced in a flue with only a section producing reduced turbulence do not filter as readily as the agglomerates prepared under constant turbulence or as readily as the agglomerates of the present invention. The present invention results in TiO₂ agglomerates that are softer than agglomerates prepared in a constant turbulence flue and they filter almost as readily as those prepared under constant turbulence.

The present invention thus results in the preparation of TiO₂ agglomerates that can be ground with less energy than agglomerates prepared in a flue of constant turbulence and yet filter more rapidly than those made in flues designed merely to have the defined turbulence without a subsequent increased turbulence.

Accordingly, the invention involves a reaction cooling flue configuration, useful in transferring and cooling reaction products from the oxidation of a metal halide to the metal oxide with oxygen at high temperatures, which comprises a section of flue wherein the reaction products from the oxidation reaction are conveyed in a turbulent manner as defined by a Reynolds number generally of from 50,000–1,000,000, preferably 100,000–800,000 and most preferably 250,000–700,000 and then subsequently a section wherein the reaction products are conveyed in a more turbulent manner as defined generally by a Reynolds number of from 75,000–1,600,000, preferably 200,000–1,300,000 and most preferably 300,000–1,000,000.

In accordance with the invention a reaction cooling system configuration, also referred to herein as a flue, useful in transferring and cooling reaction products from the high temperature oxidation of a metal halide to the metal oxide with oxygen has been found, said flue having a first section with the same or greater cross-sectional area relative to the section immediately preceding it in order to achieve the required Reynolds number, followed by a second section with a reduced cross-sectional area, said second section defined as a configuration that will increase the velocity of flow as well as the turbulence of the reaction product through the section. Turbulence in the sections of the flue is evidenced by the Reynolds number of the reaction product. In the present application the Reynolds number was calculated based on the gaseous component without the inclusion of any solid component. The solid component, e.g., $TiO_2$, scrubbing solids, etc., generally are about 10–45% by weight of the total flow.

The process of the invention involves the use of the flue described herein for preparing a pigmentary $TiO_2$. Accordingly, the present invention is also a process for preparing pigmentary $TiO_2$ by vapor phase oxidation of $TiCl_4$ in a reaction chamber at temperatures above 900° C. wherein a gaseous effluent product stream is removed from the reaction chamber via a flue, where the $TiO_2$ and the gaseous mixture, including any diluents normally used for such oxidation, are cooled, the improvement comprising removing the product stream through a flue of a configuration that results in a reduction of the velocity of the flow containing the reaction product during a period when the $TiO_2$ particles are in a sticky state and tend to form hard agglomerates followed by a flue configuration that results in an increase in the velocity of the flow containing the reaction product when the pigmentary particles of $TiO_2$ tend to form soft agglomerates thereby producing $TiO_2$ agglomerates which have a faster filtration rate than agglomerates prepared in flues outside the scope of the invention and which are more easily deagglomerated to pigmentary size than agglomerates prepared in flues outside the scope of the invention.

The flue is merely a section after the reaction chamber through which the reaction products pass in order to cool the products formed. Although some further reaction usually does occur, after the reaction chamber, in the flue, the reaction is essentially complete in the reaction chamber.

The location of the first section that will provide the desired turbulence for the $TiO_2$/gaseous reaction products must be in the temperature region where hard agglomerates of $TiO_2$ can be formed. The exact physical location and length of the section depends on the make-up of the mixture being reacted and the temperature. This configuration, e.g., in the case of a cylindrical flue, can be a section with the same diameter as the reaction chamber or an increased diameter relative to the previous section for a sufficient length for the $TiO_2$ to reach a temperature where hard agglomerates are minimized.

The location of the section that will provide the desired turbulence for the $TiO_2$/gaseous reaction products must be in the temperature region where soft agglomeration of $TiO_2$ can be formed. The exact physical location and length depends on the make-up of the mixture being reacted and the temperature. This configuration, e.g., in the case of a cylindrical flue, is a section with a reduced or decreased diameter relative to the previous section for a sufficient length for the $TiO_2$ to form soft agglomerates of $TiO_2$.

The first section with the same or the increased cross-sectional area is generally located where the average estimated temperature of the gaseous stream is in the range of 1100°–1900° K., preferably 1400°–1750° K., while the second section with the decreased cross-sectional area is in the range 1000°–1800° K., preferably 1500°–1650° K. The above temperatures are assumed to be also the temperature of the $TiO_2$ in the gaseous stream.

Thus the desired length of the first section is dependent on the temperature. The desired length of the second section, however, is dependent on the temperature, turbulence and time. Generally, the time in the second section is at least 0.05 and preferably at least 0.10 second.

The reaction chamber length for purposes of this invention begins with the point of addition of the metal halide to the oxygen. This point of addition into the reaction chamber is referred to as the inlet. When the first section involving the reduced cross-sectional area referred to above is located too distant from the inlet, the temperature will be such that hard agglomerates will have formed before the reduced section. The reduced section can be located as near to the inlet as possible provided sufficient length and cooling has been allowed for the formation of pigmentary size ultimate particles of $TiO_2$. Ultimate particles of $TiO_2$ are those that are not significantly reduced by grinding such as in the fluid energy mill.

The location of the flue section wherein the velocity or turbulence of the gaseous reaction product mixture flow is caused to increase can be defined with respect to the properties of the $TiO_2$ produced. The flue section wherein the velocity is increased must be located within sufficient distance of the inlet to give soft agglomerates of $TiO_2$ that will filter more readily than agglomerates produced by a flue with merely an expanded section. Generally filtration washing rates of the present invention are 1.0–3.0 ml/sec and usually 1.0–2.0 ml sec. The washing rate was found to be proportional to the overall filtration of the aqueous agglomerate slurry, both in the untreated and treated state.

Although the invention has been described in regard to the same cross-sectional area or increased cross-section area for the first section and decreased cross-sectional area for the second section of a flue, any means for attaining the turbulence indicated by the Reynolds numbers given are within the scope of this invention.

The flue can be periodically or continuously treated with conveyed solids to scrub the walls of deposits. Such methods are disclosed in U.S. Pat. No. 3,511,308.

The invention is further illustrated by the example below.

EXAMPLE 1

Vapor phase oxidation of titanium tetrachloride was carried out in a suitable high temperature cylindrical reaction vessel. Oxidation products comprising a suspension of titanium dioxide pigment in a gaseous stream comprising chlorine, unreacted oxygen and other conventional diluents having a total solids content of 31% by weight, were passed through a water-cooled flue with a first section of expanded cross-sectional area sufficient to provide an average Reynolds number of 637,000. The estimated average temperature of the gaseous stream entering the expanded section was 1660° K. The first section began 7.8 meters from the titanium tetrachloride inlet point and was 11.2 meters long followed by a second section 18 meters in length of reduced cross-sectional area sufficient to provide a Reynolds number of 960,000. The estimated average temperature of the gaseous stream entering the reduced section was 1560° K. The TiO$_2$ particles were separated from the gases slurried in water and treated with sodium aluminate which was acid precipitated to give 3% Al$_2$O$_3$. The treated TiO$_2$ was washed, filtered, dried and fluid energy milled. The table below shows the data obtained:

| Example | Filtration Wash Rate* ml/sec Avg | Steam/Pigment Ratio Avg | Gloss 30-J Avg |
|---------|----------------------------------|-------------------------|----------------|
| 1       | 1.5                              | 3.0                     | 69             |
| A       | 1.8                              | 3.7                     | 69             |
| B       | 1.8                              | 3.0                     | 66             |
| C       | 0.9                              | 3.0                     | 69             |

*of the untreated product.

Examples A and B were control runs conducted with a flue that had a constant turbulence with an average Reynolds number of 955,000 wherein the TiO$_2$ was treated in the same manner as in Example 1. Example C was a run involving a flue with a section having an increased cross-sectional area section with a reduced velocity and turbulence equivalent to an average Reynolds number of 638,000 without any subsequent reduced cross-sectional area. The TiO$_2$ was also treated as described in Example 1. The expanded section was located 9.7 meters from the inlet and was extended to a point where the temperature was below 1100° K. where there is no significant effect on the TiO$_2$ particles.

All the above data represents an average of several runs and determinations. The gloss of 66, as compared to 69, is a significant difference. The present invention results in a significant reduction in energy to achieve the gloss that is achieved with flues outside the scope of the invention.

The above 30-J Gloss Test was carried out by sand milling the TiO$_2$ in an alkyd resin/melamine formaldehyde resin mixture at 18.8% TiO$_2$ volume concentration and thereafter applying the paint to an aluminum surface at a dry film thickness of about 0.03 mm. The paint was baked for 45 minutes at 150° C. after air drying at room temperature for 15 minutes. The gloss of the baked paint was measured at 20° by Hunter Lab Model D-16-D Glossmaster.

The above filtration rates were determined by slurrying 75 grams of TiO$_2$ in 225 grams of water at a temperature of 20°-25° C. and then pouring the slurry into a Buchner funnel using filter cloth of 0.00093 sq meter and vacuum of 0.51 meter of mercury. The filtered TiO$_2$ is washed twice with 150 ml of water at 20°-25° C. and the average flow rate through the filter of two washings is the filtration rate.

The steam to pigment ratio is the grams of superheated steam fed to the fluid energy mill per gram of pigment fed.

It is to be understood that any of the components and conditions mentioned as suitable herein can be substituted for its counterpart in the foregoing examples and that although the invention has been described in considerable detail in the foregoing, such detail is solely for the purpose of illutration. Variations can be made in the invention by those skilled in the art without departing from the spirit and scope of the invention except as set forth in the claims.

We claim:

1. In a process for preparing pigmentary TiO$_2$ by vapor phase oxidation of TiCl$_4$ in the reaction chamber at temperatures above 900° C. wherein a gaseous effluent product stream is removed from the reaction chamber via a flue, where the reaction products are cooled, the improvement comprising removing the product stream first through a flue of a configuration comprising a first section connected to the reaction chamber wherein the flow of the reaction products are conveyed through said first section where the temperature of the gaseous stream is 1100°-1900° K. when the TiO$_2$ particles are sticky and tend to form hard agglomerates of TiO$_2$ in a turbulent manner at a velocity as defined by a Reynolds number of from 50,000-1,000,000 then through a second section where the temperature of the gaseous stream is 1000°-1650° K. with a decreased cross-sectional area that results in an increase in the turbulence and an increased velocity as defined by a Reynolds number of from 75,000-1,600,000 when the pigmentary particles of TiO$_2$ are less sticky and tend to form soft agglomerates, the resulting TiO$_2$ agglomerates having an improved filtration rate relative to TiO$_2$ agglomerates produced in a flue without said second section and being easily deagglomerated to pigmentary size.

2. The process of claim 1 wherein the Reynolds number in the first section is 100,000-800,000 and the Reynolds number in the second section is 200,000-1,300,000.

3. The process of claim 1 wherein the Reynolds number in the first section is 250,000-700,000 and the Reynolds number in the second section is 300,000-1,000,000.

* * * * *